J. M. Muhlig,
Sieve.

N° 56,083. Patented July 3, 1866.

Witnesses:
Asa Wellington
Luther Briggs

Inventor;
James M. Muhlig

UNITED STATES PATENT OFFICE.

JAMES M. MUHLIG, OF CAMBRIDGE, MASSACHUSETTS.

SIFTER AND STRAINER.

Specification forming part of Letters Patent No. 56,083, dated July 3, 1866.

*To all whom it may concern:*

Be it known that I, JAMES M. MUHLIG, of Cambridge, in the county of Middlesex and Commonwealth of Massachusetts, have invented a new and useful Sifter and Strainer, to be used for and applied to all purposes of sifting and straining; and I do hereby declare that the following description, with the accompanying drawings, forms a full, clear, and exact specification thereof.

One compact, convenient, and simple apparatus, applicable alike in families to all the purposes of sifting and straining, is a great desideratum. This I claim to have effected in my present invention.

The accompanying drawings represent my invention.

Figure 2:
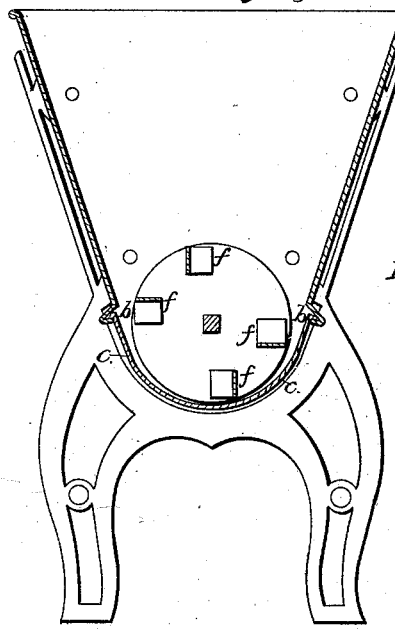
Figure 3:
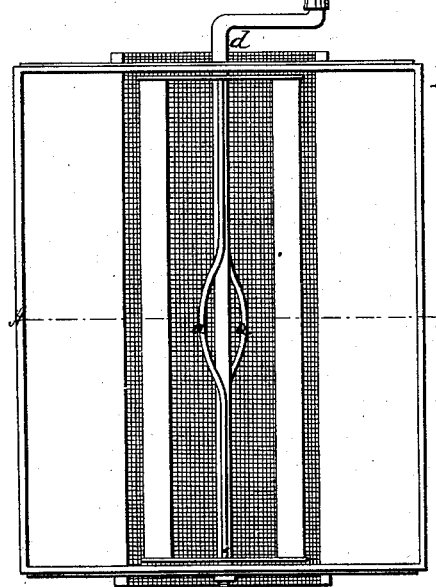

The beaters used for breaking up substances and pressing them through the sieves and strainers are represented by $a\ a$ in Figure 3, which is a top view of said machine, and are secured at each end by cylindrical heads, one of which is $f f f f$, as seen in Fig. 2, which is a vertical section on line A B, and are made to revolve by a crank or shaft, $d\ d$, as seen in Fig. 3.

Figure 1:
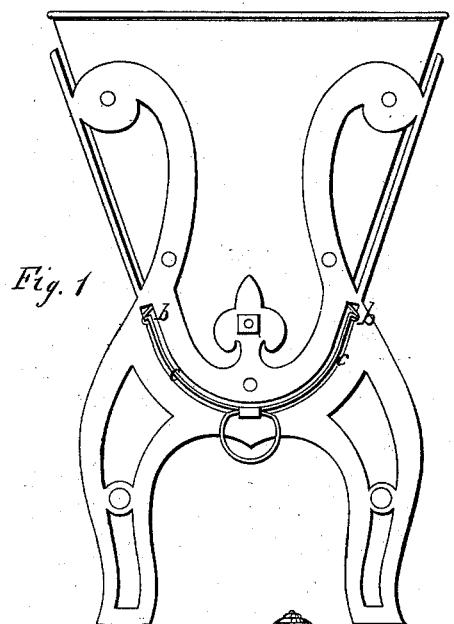

The semicircular slots are represented by $c\ c$, as seen in Fig. 2, and also by $c\ c$, as seen in Fig. 1, which is an end elevation. Said slots, in combination with the grooves hereinafter described, are used for the insertion of the several semicircular sieves and strainers, also hereinafter described, immediately beneath and in contact with said beaters. The two grooves are represented by $b\ b$ in Fig. 2, and also by $b\ b$ in Fig 1, running the whole distance between the two end sections, and are used for the insertion through said slots of the several sieves and strainers, and for keeping them firmly in contact with said beaters.

Figure 4:
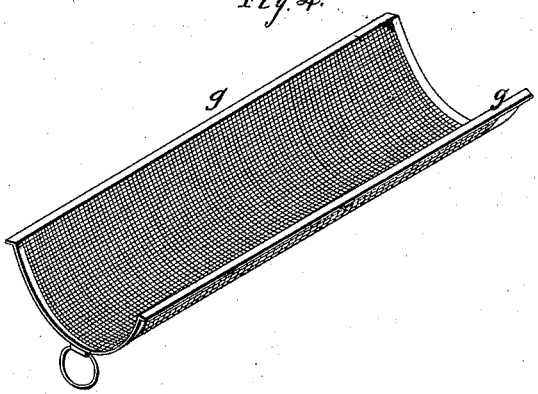

The semicircular sieves and strainers are represented by Fig. 4. They are made of wires and perforated tin, and are firmly bound, having side lips, $g\ g$, which are inserted in the aforesaid grooves. These sieves and strainers thus passed through said slots and along said grooves are kept firmly in contact beneath said beaters.

What I claim is—

The combination and arrangement of the curved metallic beaters, and the changeable sliding sieves and strainers, and the devices for securing them in position as described, for the purpose specified.

JAMES M. MUHLIG.

Witnesses:
ASA WELLINGTON,
LUTHER BRIGGS.